(12) United States Patent
Choi et al.

(10) Patent No.: US 12,175,174 B2
(45) Date of Patent: Dec. 24, 2024

(54) APPARATUS AND METHOD OF OPTIMIZING A RESTRAINT SPECIFICATION BASED ON A PARTICLE SWARM OPTIMIZATION ALGORITHM USING IMPACT ANALYSIS

(71) Applicants: HYUNDAI MOTOR COMPANY, Seoul (KR); KIA MOTORS CORPORATION, Seoul (KR)

(72) Inventors: Jong Hun Choi, Incheon (KR); Hong Jung Kim, Goryong-ri (KR); Seung Kyu Kang, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 1052 days.

(21) Appl. No.: 16/930,845

(22) Filed: Jul. 16, 2020

(65) Prior Publication Data
US 2021/0097219 A1 Apr. 1, 2021

(30) Foreign Application Priority Data
Sep. 27, 2019 (KR) .................. 10-2019-0119698

(51) Int. Cl.
*G06F 30/27* (2020.01)
*G06F 16/22* (2019.01)
(Continued)

(52) U.S. Cl.
CPC .......... *G06F 30/27* (2020.01); *G06F 16/2282* (2019.01); *G06F 2111/06* (2020.01); *G06Q 50/265* (2013.01)

(58) Field of Classification Search
CPC .. G06F 30/27; G06F 16/2282; G06F 2111/06; G06F 30/20; G06Q 50/265
See application file for complete search history.

(56) References Cited

U.S. PATENT DOCUMENTS

2012/0078472 A1   3/2012   Neal
2018/0365772 A1*  12/2018  Thompson ............. G06Q 50/40

FOREIGN PATENT DOCUMENTS

CN    109766579 A    5/2019

OTHER PUBLICATIONS

X. Gu, G. Sun, G. Li, "Multiobjective optimization design for vehicle occupant restraint system under frontal impact", pp. 465-477, (Year: 2012).*

(Continued)

*Primary Examiner* — Kibrom K Gebresilassie
(74) *Attorney, Agent, or Firm* — Lempia Summerfield Katz LLC (57) ABSTRACT

An apparatus and a method optimize a restraint specification based on a particle swarm optimization algorithm using impact analysis between the restraint specification and passenger injuries. A passenger injury prediction value is generated according to the injury degree of a passenger by sequentially inputting values according to specifications of each design variable included in the injury result data into a particle swarm optimization algorithm. The optimization algorithm is implemented with a plurality of computational layers formed for each detailed configuration in order to search for an optimal specification of a restraint. Information on the optimal specification of the restraint is provided by calculating a comprehensive result indicator using the passenger injury prediction value. Thus, the information on the optimal specification of the restraint can be calculated without repetitive evaluation tests.

16 Claims, 7 Drawing Sheets

(51) Int. Cl.
G06F 111/06 (2020.01)
G06Q 50/26 (2012.01)

(56) References Cited

OTHER PUBLICATIONS

X. Gu, J. Lu, "Reliability-based robust assessment for Multiobjective optimization design of improving occupant restraint system performance", pp. 1169-1180, (Year: 2014).*

Office Action cited in Chinese patent application No. 202010787856.3; Oct. 24, 2024; 18 pp.

* cited by examiner

| restraint | specification | DAB | | | | | | | | | | | | | | seat belt | | | |
|---|---|---|---|---|---|---|---|---|---|---|---|---|---|---|---|---|---|---|---|
| | | ① vent hole(mm) | | | | | | ② upper tether(inch) | | | | | ③ lower tether(inch) | | | | ④ load limiter(kN) | | | |
| | | 10 | 15 | 20 | 25 | 30 | 8 | 9 | 10 | 11 | 12 | 7 | 8 | 9 | 10 | 11 | 3 | 3.5 | 4 | 4.5 |
| driver's seat / passenger injury part | HIC | 351.9 | 326.9 | 313.1 | 286.5 | 614.9 | 328.9 | 314.1 | 298.1 | 286.5 | 276.4 | 272 | 281.6 | 286.5 | 295.2 | 291 | 267.6 | 286.5 | 304.3 | 316.2 |
| | CD | 23.2 | 22.9 | 21.6 | 21.6 | 20.6 | 21.2 | 21 | 21.2 | 21.1 | 21.2 | 21.3 | 21.5 | 21.1 | 20.7 | 20.5 | 19.6 | 21.1 | 22.4 | 23.5 |
| | Nte | 0.12 | 0.17 | 0.25 | 0.34 | 0.35 | 0.32 | 0.33 | 0.33 | 0.34 | 0.34 | 0.33 | 0.34 | 0.34 | 0.36 | 0.4 | 0.26 | 0.34 | 0.33 | 0.32 |
| | Ntf | 0.27 | 0.25 | 0.24 | 0.22 | 0.32 | 0.24 | 0.23 | 0.22 | 0.22 | 0.22 | 0.24 | 0.23 | 0.22 | 0.23 | 0.23 | 0.24 | 0.22 | 0.28 | 0.31 |
| | Nce | 0.24 | 0.29 | 0.34 | 0.35 | 0.38 | 0.35 | 0.36 | 0.37 | 0.35 | 0.35 | 0.29 | 0.32 | 0.35 | 0.4 | 0.44 | 0.35 | 0.35 | 0.36 | 0.36 |
| | Ncf | 0.18 | 0.2 | 0.24 | 0.24 | 0.18 | 0.24 | 0.25 | 0.25 | 0.24 | 0.24 | 0.23 | 0.23 | 0.24 | 0.25 | 0.24 | 0.20 | 0.24 | 0.00 | 0.00 |

− top (5★▲) prediction combination : ten specifications

| division | restraint specification | | | | prediction result | | | |
|---|---|---|---|---|---|---|---|---|
| | V/Hole | UPR TT | LWR TT | L/L | HIC | Nij | chest | total |
| optimal specification | Φ25 | 12" | 7" | 3.0kN | 267.7 | Nce 0.30 | 20.3 | 5.03★ |
| #2 | Φ20 | 11" | 7" | 3.0kN | 292.9 | Nce 0.29 | 20.6 | 5.01★ |
| #3 | Φ20 | 12" | 7" | 3.0kN | 286.3 | Nce 0.29 | 20.6 | 5.01★ |
| #4 | Φ25 | 10" | 7" | 3.0kN | 282.2 | Nce 0.30 | 20.3 | 5.01★ |
| #5 | Φ25 | 11" | 7" | 3.0kN | 274.3 | Nce 0.30 | 20.3 | 5.01★ |
| #6 | Φ15 | 11" | 7" | 3.0kN | 303.1 | Nce 0.27 | 21.5 | 5.00★ |
| #7 | Φ15 | 12" | 7" | 3.0kN | 296.5 | Nce 0.27 | 21.5 | 5.00★ |
| #8 | Φ15 | 12" | 8" | 3.0kN | 296.5 | Nce 0.27 | 21.7 | 5.00★ |
| #9 | Φ20 | 10" | 7" | 3.0kN | 300.8 | Nce 0.29 | 20.6 | 5.00★ |
| #10 | Φ25 | 9" | 7" | 3.0kN | 293.6 | Nce 0.30 | 20.3 | 5.00★ |

− bottom (3★▼) prediction combination : seven specifications

| division | restraint specification | | | | prediction result | | | |
|---|---|---|---|---|---|---|---|---|
| | V/Hole | UPR TT | LWR TT | L/L | HIC | Nij | chest | total |
| #11 | Φ30 | 8" | 11" | 4.5kN | 682.1 | Nce 0.48 | 22.1 | 2.92★ |
| #12 | Φ30 | 8" | 7" | 4.5kN | 682.1 | Nce 0.45 | 22.6 | 2.94★ |
| #13 | Φ30 | 8" | 8" | 4.5kN | 682.1 | Nce 0.45 | 22.7 | 2.94★ |
| #14 | Φ30 | 8" | 9" | 4.5kN | 682.1 | Nce 0.45 | 22.5 | 2.94★ |
| #15 | Φ30 | 8" | 10" | 4.5kN | 682.1 | Nce 0.45 | 22.2 | 2.94★ |
| #16 | Φ30 | 8" | 11" | 4.0kN | 673.5 | Nce 0.48 | 21.3 | 2.94★ |
| #17 | Φ30 | 9" | 11" | 4.5kN | 671.0 | Nce 0.48 | 22.1 | 2.94★ |

APPARATUS AND METHOD OF OPTIMIZING A RESTRAINT SPECIFICATION BASED ON A PARTICLE SWARM OPTIMIZATION ALGORITHM USING IMPACT ANALYSIS

CROSS REFERENCE TO RELATED APPLICATION

The present application claims priority to Korean Patent Application No. 10-2019-0119698, filed Sep. 27, 2019, the entire contents of which are incorporated herein for all purposes by this reference.

BACKGROUND OF THE INVENTION

Field of the Invention

The present disclosure relates to a technology capable of determining detailed specifications of a restraint optimized to minimize passenger injuries. More specifically, the present disclosure relates to an apparatus and method of optimizing a restraint specification based on a particle swarm optimization algorithm using impact analysis between the restraint specification and passenger injuries.

Description of the Related Art

In order to derive an optimal specification in the design of an automobile restraint, it is common that numerous crash tests are repeated several times to collect the injury degree for each body part through test results. Such tests are performed in such a manner to change the detailed specification of the restraint.

Herein, as the crash test, a new car assessment program (NCAP) evaluation method using actual vehicle crashes is mainly used and the test is commonly used as a vehicle safety evaluation.

According to the NCAP evaluation method in the related art, a complete vehicle is tested at prototype to pilot stages during vehicle development. The tuned restraint specific specification is applied to the completed vehicle. A test dummy is repeatedly mounted on the vehicle according to each specific specification. The vehicle is collided with a fixed wall or barrier at a speed of 56 kph. By such a method, test dummy data is obtained.

Herein, NCAP performance, such as head injury criterion (HIC), neck injury criterion (Nij), chest displacement (CD), and femur injury can be calculated by calculating injuries for each part of a test dummy on a driver's seat/passenger's seat from the acquired data. Manual factor analysis is performed using the calculation result and then an optimal restraint specification can be selected according to the analysis result.

However, since a method of manually selecting the optimal restraint specification according to analysis and experience of an engineer is used in the related art, there is a concern that it is impossible to predict the specification. Thus, subjective interpretation may be included depending on experience. There is a problem that excessive labor and test costs are incurred due to repetitive tests caused by a lack of interrelationship.

SUMMARY OF THE INVENTION

Accordingly, the present disclosure has been made considering the above problems occurring in the prior art. An objective of the present disclosure is to provide a technique by which a passenger injury prediction value is generated according to the injury degree of a passenger by sequentially inputting values according to specifications of each design variable included in the injury result data into a particle swarm optimization algorithm. The particle swarm optimization algorithm is implemented with a plurality of computational layers formed for each detailed configuration in order to search for an optimal specification of a restraint. Information on the optimal specification of the restraint is calculated through the passenger injury prediction value.

According to an embodiment of the present disclosure, an apparatus for optimizing a restraint specification based on a particle swarm optimization algorithm uses impact analysis between the restraint specification and a passenger injury. The apparatus includes, by using the particle swarm optimization algorithm that includes a plurality of computational layers, a restraint specification input unit configured to receive passenger injury data for each part according to each design variable specification using each detailed configuration of the restraint as each design variable. Thus, an injury result data table is generated for each specification. The apparatus further includes a passenger injury prediction unit configured to generate a passenger injury prediction value by inputting the injury result data table for each design variable specification into a prediction model for each design variable specification and a passenger injury prediction result for each part. The passenger injury prediction unit is further configured to use the passenger injury prediction value to calculate a comprehensive result indicator. The apparatus further includes an optimal specification selection unit configured to select a detailed configuration of a restraint included in a data group with a highest comprehensive result indicator to be optimal value.

According to an embodiment of the present disclosure, the passenger injury prediction unit may include an injury prediction result generator. The injury prediction result generator may be configured to generate the prediction model based on the particle swarm optimization algorithm for each design variable specification and the passenger injury prediction result for each part using the third-order Hermit interpolation polynomial for each interval. The injury prediction result generator may be further configured to input the injury result data table of each design variable specification into the prediction model to generate the passenger injury prediction value. The passenger injury prediction unit may further include a comprehensive result calculator configured to calculate the comprehensive result indicator according to a preset criterion using the passenger injury prediction result for each part.

According to an embodiment of the present disclosure, the comprehensive result calculator may calculate the comprehensive result indicator according to a new car assessment program (NCAP) evaluation method based on the passenger injury prediction results for each part.

According to an embodiment of the present disclosure, the restraint specification input unit may use standards of a vent hole diameter, an upper tether length, a lower tether length, and a load limiter force for the detailed configuration of the restraint as each design variable.

According to an embodiment of the present disclosure, the restraint specification input unit may analyze an impact degree by sequentially inputting numerical values according to each design variable specification included in the injury result data into each computational layer in the particle swarm optimization algorithm. The particle swarm optimization algorithm may be implemented with the plurality of computational layers formed for each design variable in order to calculate a weight for each variable by performing component analysis on each of normalized variables.

According to an embodiment of the present disclosure, the restraint specification input unit may be provided so that the plurality of computational layers is capable of calculating the impact degree using each of a vent hole diameter, an upper tether length, a lower tether length, and a load limiter force as a variable.

According to an embodiment of the present disclosure, the restraint specification input unit may be provided so that the plurality of computational layers is arranged in the order of a vent hole diameter layer, an upper tether length layer, a lower tether length layer, and a load limiter force layer. The restraint specification input unit may also be provided so that a resultant value calculated in each layer becomes an input value of a layer located behind the layer.

According to an embodiment of the present disclosure, the restraint specification input unit may normalize each variable before inputting standards for the detailed configuration of the restraint as each variable. The restraint specification input unit may further perform weight analysis for each of the normalized variables to calculate a weight for each variable.

According to an embodiment of the present disclosure, the restraint specification input unit may calculate the passenger injury prediction value according to an injury degree of a passenger by reflecting the weight for each variable.

According to an embodiment of the present disclosure, the injury prediction result generation unit may calculate passenger injury prediction results of a head injury criterion (HIC), a chest displacement (CD), and a neck injury criterion (Nij) as the passenger injury prediction result for each part.

According to an embodiment of the present disclosure, a method optimizes a restraint specification based on a particle swarm optimization algorithm using impact analysis between the restraint specification and a passenger's injury. The method includes, by using the particle swarm optimization algorithm that includes a plurality of computational layers, receiving passenger injury data for each part according to each design variable specification using each detailed configuration of the restraint as each design variable. Thus, an injury result data table is generated for each specification. The method further includes generating a passenger injury prediction value by inputting the injury result data table for each design variable specification into a prediction model for each design variable specification and a passenger injury prediction result for each part. The method further includes calculating a comprehensive result indicator by using the passenger injury prediction value and selecting a detailed configuration of the restraint included in a data group with a highest comprehensive result indicator to be optimal value.

According to an embodiment of the present disclosure, the calculating of the comprehensive result indicator may include generating the prediction model based on the particle swarm optimization algorithm for each design variable specification and the passenger injury prediction result for each part. The prediction model may be generated by using a third-order Hermit interpolation polynomial for each interval and generating the passenger injury prediction value by inputting the injury result data table of each design variable specification into the prediction model. The comprehensive result indicator may be calculated according to a preset criterion using the passenger injury prediction result for each part.

According to an embodiment of the present disclosure, the calculating of the comprehensive result indicator may include calculating the comprehensive result indicator according to a NCAP evaluation method based on the passenger injury prediction results for each part.

According to an embodiment of the present disclosure, the generating of the injury result data table may use standards of a vent hole diameter, an upper tether length, a lower tether length, and a load limiter force for the detailed configuration of the restraint as each design variable.

According to an embodiment of the present disclosure, the generating of the injury result data table may include analyzing an impact degree by sequentially inputting numerical values according to each design variable specification included in the injury result data into each computational layer in the particle swarm optimization algorithm. The particle swarm optimization algorithm may be implemented with the plurality of computational layers formed for each design variable in order to calculate a weight for each variable by performing component analysis on each of normalized variables.

According to an embodiment of the present disclosure, the generating of the injury result data table may be provided so that the plurality of computational layers is capable of calculating the impact degree using each of a vent hole diameter, an upper tether length, a lower tether length, and a load limiter force as a variable.

According to an embodiment of the present disclosure, the generating of the injury result data table may be provided so that the plurality of computational layers is arranged in the order of a vent hole diameter layer, an upper tether length layer, a lower tether length layer, and a load limiter force layer. The generating of the injury result data table may be also provided so that a resultant value calculated in each layer becomes an input value of a layer located behind the layer.

According to an embodiment of the present disclosure, the generating of the injury result data table may include normalizing each variable before inputting standards for the detailed configuration of the restraint as each variable. The generating of the injury result data table may further include performing weight analysis for each of the normalized variables to calculate a weight for each variable.

According to an embodiment of the present disclosure, the generating of the injury result data table may include calculating the passenger injury prediction value according to an injury degree of a passenger by reflecting the weight for each variable.

According to an embodiment of the present disclosure, the generating of the passenger injury prediction value may include calculating passenger injury prediction results of a HIC, a CD, and a Nij as the passenger injury prediction result for each part.

According to the present disclosure, even though an evaluation test is not repeated for each detailed configuration of a restraint, there are advantages that a passenger injury prediction value according to the passenger injury level can be generated for each specification for the detailed configuration of the restraint. The generation may be performed through a plurality of computation layers implemented via a particle swarm optimization algorithm by using an injury result according to the standard specification of the evaluation test which has been already performed. Thus, the information on the optimal specification of the restraint may be calculated without repetitive evaluation tests.

BRIEF DESCRIPTION OF THE DRAWINGS

The above and other objects, features, and other advantages of the present disclosure should be more clearly understood from the following detailed description when taken in conjunction with the accompanying drawings, in which.

DETAILED DESCRIPTION OF THE INVENTION

Hereinafter, embodiments of the present disclosure are described in detail with reference to the accompanying drawings. Thus, those having ordinary skill in the art may easily implement the present disclosure. As those having ordinary skill in the art would realize, the described embodiments may be modified in various different ways without departing from the spirit or scope of the present disclosure.

In the drawings, parts irrelevant to the description have been omitted for simplicity of explanation. Identical or similar reference numerals designate identical or equivalent parts throughout the specification.

Throughout the specification, when a part "includes" a certain component, it means that the part does not exclude other components but may further include other components, unless specifically stated otherwise.

Hereinafter, an apparatus and a method of optimizing a restraint specification based on a particle swarm optimization algorithm according to an embodiment of the present disclosure are described with reference to the accompanying drawings.

Figure 1:
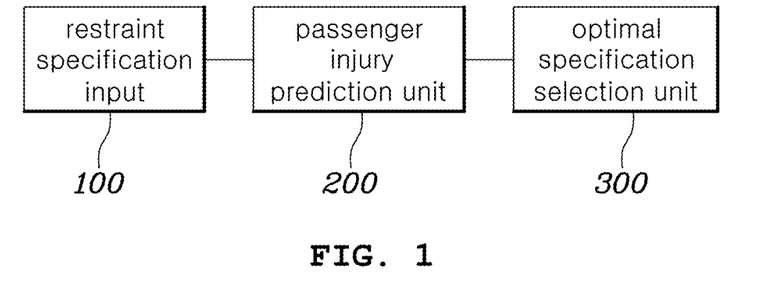
FIG. 1 is a block diagram illustrating an apparatus for optimizing a restraint specification based on a particle swarm optimization algorithm according to an embodiment of the present disclosure.

FIG. 1 is a block diagram illustrating an apparatus for optimizing a restraint specification based on a particle swarm optimization algorithm according to an embodiment of the present disclosure.

Referring to FIG. 1, an apparatus for optimizing a restraint specification based on a particle swarm optimization algorithm according to an embodiment of the present disclosure may use a particle swarm optimization algorithm including a plurality of computational layers. The apparatus may include a restraint specification input unit 100, a passenger injury prediction unit 200, and an optimal specification selection unit 300.

According to an embodiment of the present disclosure, the particle swarm optimization algorithm is an algorithm, which derives its inspiration from the social behavior and dynamics of fish and birds. The particle swarm optimization algorithm may refer to an algorithm that can search for an optimal solution (specification) through the information exchange and movement characteristics of entities based on specification information given at random.

According to the above embodiment, each entity may determine a new position through its previous orientation, its own optimal orientation, and an optimal orientation of the entire cluster.

The restraint specification input unit 100 may receive passenger injury data for each part according to the specification of each design variable and generate the injury result data table for each specification by using each detailed configuration of the restraint as each design variable.

According to an embodiment of the present disclosure, the detailed configuration of the restraint may include a vent hole, an upper tether, and a lower tether in a driver air bag (DAB). The detailed configuration of the restraint may include a load limiter in a seat belt but is not limited thereto. The detailed configuration of the restraint may be used without limitation as long as it is a part included in the restraint that may affect a passenger's injury due to a change in the specification.

According to an embodiment of the present disclosure, the standards of a vent hole diameter, an upper tether length, a lower tether length, and a load limiter force may be set as each design variable for the detailed configuration of the restraint.

According to an embodiment of the present disclosure, before inputting the standards for the detailed configuration of the restraint as each variable, it is possible to normalize each variable and perform component analysis on each normalized variable to calculate a weight for each variable.

According to an embodiment of the present disclosure, the restraint specification input unit 100 may set each detailed configuration as a design variable. The restraint specification input unit 100 may receive passenger injury data for each part according to a change in the specification for each design variable. The restraint specification input unit 100 may generate an injury result data table for each specification based on the received passenger injury data.

According to an embodiment of the present disclosure, in order to calculate the weight for each variable by performing component analysis on each normalized variable, it is possible to analyze the impact degree in the particle swarm optimization algorithm. The particle swarm optimization algorithm may be implemented with a plurality of computational layers formed for each design variable. The impact degree may be analyzed by sequentially inputting numerical values according to the specifications of each design variable included in the injury result data into each computational layer.

Figure 5:
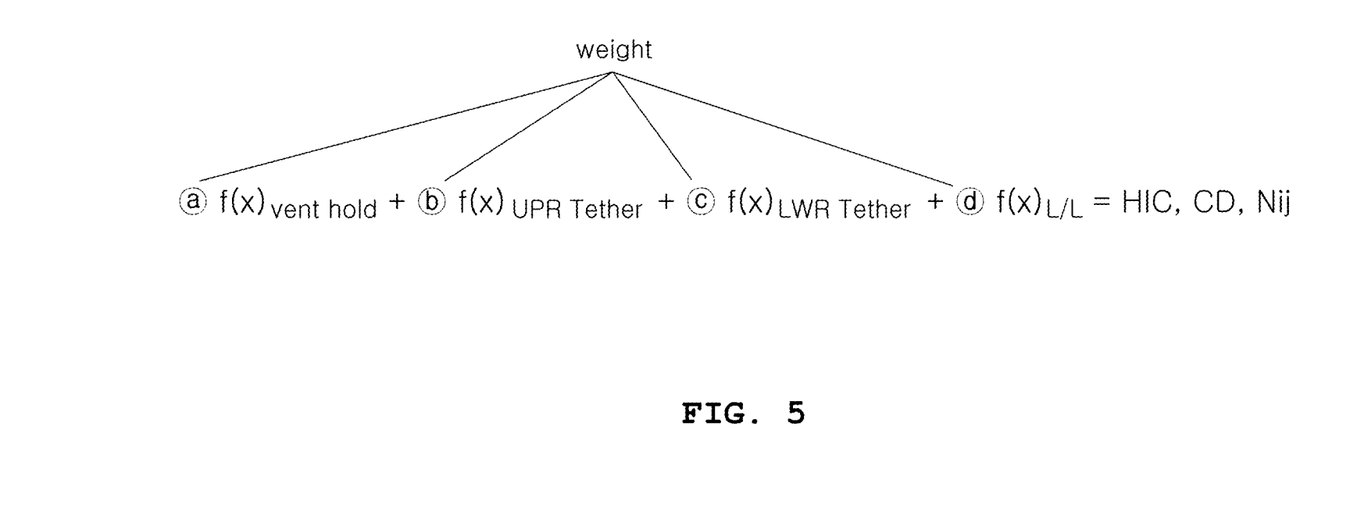
FIG. 5 is a diagram illustrating a calculation of weights for each variable by normalizing each variable according to an embodiment of the present disclosure.

According to an embodiment of the present disclosure, the calculation of the weight for each variable is shown in detail in FIG. 5.

According to an embodiment of the present disclosure, the plurality of computational layers may calculate the impact degree by using each of the vent hole diameter, the upper tether length, the lower tether length, and the load limiter force as a variable.

According to an embodiment of the present disclosure, a plurality of computational layers are arranged in the order of a vent hole diameter layer, an upper tether length layer, a lower tether length layer, and a load limiter force layer. Thus, the resultant value calculated in each layer may be an input value of a layer located behind the layer.

Figure 4:
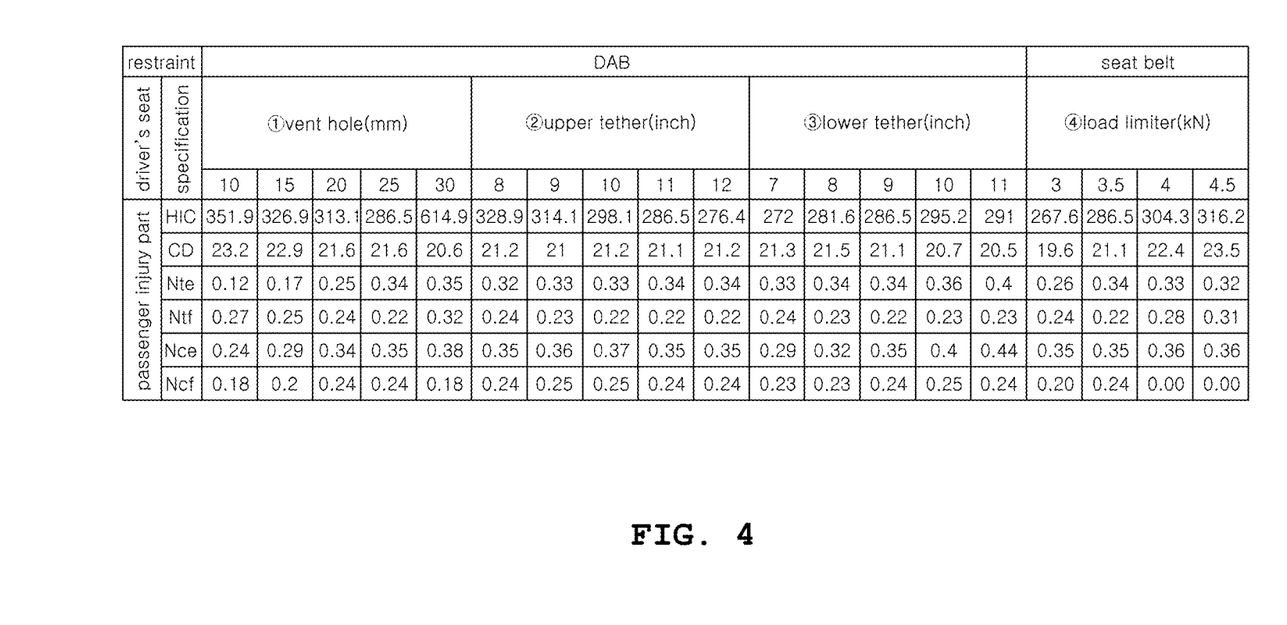
FIG. 4 is a diagram illustrating an injury result data table for each specification according to a design variable generated according to an embodiment of the present disclosure.

The injury result data table generated herein for each specification may be expressed as shown in FIG. 4.

According to an embodiment of the present disclosure, the restraint specification input unit 100 may normalize each variable before inputting the standards for the detailed configuration of the restraint as each variable.

According to an embodiment of the present disclosure, a passenger injury prediction value according to the injury degree of a passenger may be calculated by reflecting the weight for each variable.

The passenger injury prediction unit 200 generates the passenger injury prediction value by inputting an injury result data table for each design variable specification into a prediction model for each design variable specification and a passenger injury prediction result for each part. The passenger injury prediction unit 200 calculates a comprehensive result indicator using the passenger injury prediction value.

According to an embodiment of the present disclosure, the prediction model for the passenger injury prediction result for each part may be implemented based on a particle swarm optimization algorithm. The prediction model may be trained using an output value obtained by inputting the injury result data table.

According to an embodiment of the present disclosure, the training may be performed by reflecting a weight calculated by the restraint specification input unit 100 in the prediction model.

According to an embodiment of the present disclosure, the prediction model may apply a numerical analysis technique to search for a function having the highest accuracy of the passenger injury prediction value when each specification of the design variable is input.

The passenger injury prediction unit 200 is described in more detail with reference to FIG. 2.

The optimal specification selection unit 300 may select the detailed configuration of the restraint included in a data group having the highest comprehensive result indicator as an optimal value.

According to an embodiment of the present disclosure, the passenger injury prediction value for a combination consisting of specifications of each design variable is calculated. As the calculated injury prediction value is lower, the comprehensive result indicator giving a higher score is calculated. Thus, a combination of specifications for each of the design variables having the highest comprehensive result indicator may be selected to be optimal.

According to an embodiment of the present disclosure, the comprehensive result indicator may be calculated according to a new car assessment program (NCAP) evaluation method based on the injury prediction result for each part.

Herein, the NCAP evaluation method applies a tuned restraint specific specification to a completed vehicle. The NCAP evaluation method repeatedly mounts a test dummy on the vehicle according to each specific specification and collides the vehicle with a fixed wall or barrier at a speed of 56 kph. Thus, the NCAP evaluation method obtains the test dummy data, thereby obtaining injury data of a passenger. In the injury data, NCAP performance, i.e., head injury criterion (HIC), neck injury criterion, (Nij), chest displacement (CD), and femur injury may be calculated by calculating injuries for each part of a test dummy on a driver's seat/passenger's seat from the acquired data. An optimal restraint specification may be selected using the calculation result.

According to an embodiment of the present disclosure, a HIC, a CD, and a Nij may be selected as predictive parts of the injury. A knee load (Fz) of 2.8 kN as a fixed variable may not be used as a variable for prediction.

Figure 2:
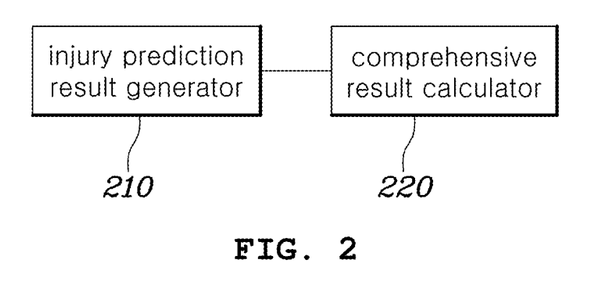
FIG. 2 is a detailed configuration diagram illustrating a passenger injury predicting unit disclosed in FIG. 1.

FIG. 2 is a detailed configuration diagram illustrating the passenger injury predicting unit 200 disclosed in FIG. 1.

Referring to FIG. 2, the passenger injury prediction unit 200 disclosed in FIG. 1 may include an injury prediction result generator 210 and a comprehensive result calculator 220.

The injury prediction result generator 210 generates a prediction model based on a particle swarm optimization algorithm for each design variable specification and a passenger injury prediction result for each part. The prediction model is generated by using a third-order Hermit interpolation polynomial for each interval. The injury prediction result generator 210 generates each design in the prediction model. The injury prediction result generator 210 generates a passenger injury prediction value by inputting the injury result data table for each design variable specification into the prediction model.

According to an embodiment of the present disclosure, the third-order Hermit interpolation polynomial for each interval may be used as a numerical analysis technique. However, the present disclosure is not limited thereto. Any function capable of selecting an optimal value through numerical analysis may be used without limitation.

Here, the third-order Hermit interpolation polynomial for each interval may mean comparing the interpolation results generated in spline and pchip for two different functions. The third-order Hermit interpolation polynomial for each interval may make a vector consisting of an x value, a function value y at that point, and a query point xq.

In addition, operations of calculating interpolation at query points and plotting function values interpolated at query points for comparison using spline and pchip may be performed.

The comprehensive result calculator 220 may calculate a comprehensive result indicator according to the preset criterion by using the injury prediction result for each part.

According to an embodiment of the present disclosure, the passenger injury prediction value for each part is calculated according to each design variable specification. The passenger injury prediction value for each part may be a HIC, a CD, and a Nij. The comprehensive result indicator may be calculated based on the calculated passenger injury prediction value for each part.

According to an embodiment of the present disclosure, the comprehensive result indicator may be calculated by reflecting a weight of each variable calculated by the restraint specification input unit 100 in the calculated passenger injury prediction value for each part.

Figure 3:
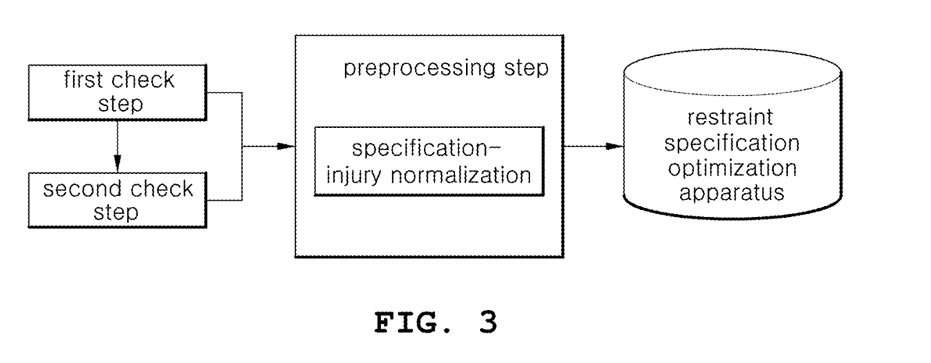
FIG. 3 is a diagram illustrating a flow in which data is input to an apparatus for optimizing a restraint specification based on a particle swarm optimization algorithm according to an embodiment of the present disclosure.

FIG. 3 is a diagram illustrating a flow in which data is input to the apparatus for optimizing a restraint specification based on a particle swarm optimization algorithm according to an embodiment of the present disclosure.

Referring to FIG. 3, according to an embodiment of the present disclosure, the passenger injury data may be obtained through evaluation tests for passenger injury results according to each design variable specification. The passenger injury data may be obtained by using the detailed configuration included in the restraint as a design variable.

According to the above embodiment, it is possible to normalize the acquired passenger injury data for each part and calculate weights according to each design variable. It is also possible to generate and train a prediction model that predicts passenger injury data according to each design variable specification reflecting the same.

In addition, a passenger injury prediction value for a combination of various detailed specifications of each design variable and a comprehensive result indicator according to the same may be generated using the trained prediction model.

In addition, the detailed configuration of the restraints included in a data group with the highest comprehensive result indicator may be selected to be optimal.

FIG. 4 is a diagram illustrating an injury result data table for each specification according to a design variable generated according to an embodiment of the present disclosure.

Referring to FIG. 4, the injury result data table for each specification is shown according to the generated design variable. The injury result data table may be generated by changing the passenger injury data in the form of a data table according to a change in the specification of each design variable. The specification of each design variable may be a vent hole, an upper tether, a lower tether, and a load limiter according to an embodiment of the present disclosure.

FIG. 5 is a diagram illustrating the calculation of weights for each variable by normalizing each variable according to an embodiment of the present disclosure.

Referring to FIG. 5, according to an embodiment of the present disclosure, a formula for calculating the weights for each variable by normalizing each variable is disclosed. The prediction model may be trained using the weights calculated as described above. The calculation may be performed by reflecting the weight in each design variable when calculating the comprehensive evaluation indicator.

Figure 6:
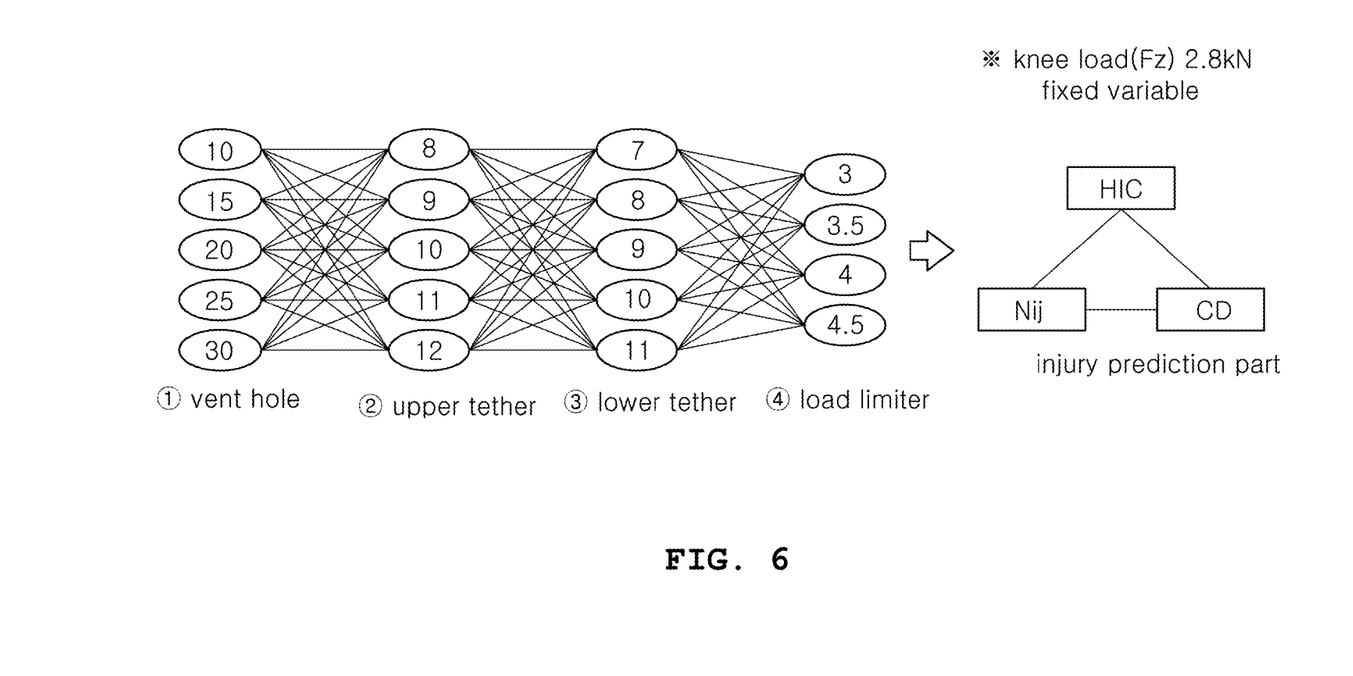
FIG. 6 is a diagram illustrating a method of analyzing an impact, in a particle swarm optimization algorithm implemented with a plurality of computational layers, by sequentially inputting numerical values according to specifications of each design variable included in injury result data into each computational layer according to an embodiment of the present disclosure.

FIG. 6 is a diagram illustrating a method of analyzing the impact by sequentially inputting numerical values according to specifications of each design variable included in injury result data into each computational layer. The analysis is performed in a particle swarm optimization algorithm implemented with a plurality of computational layers according to an embodiment of the present disclosure.

Referring to FIG. 6, the impact degree of an injury may be analyzed on each part according to the specification by sequentially inputting the numerical values according to each design variable specification included in the injury result data into each computational layer. The analysis is performed in the particle swarm optimization algorithm implemented with a plurality of computational layers formed for each design variable to perform component analysis on each normalized variable. Thus, a weight for each variable may be calculated.

Figure 7:
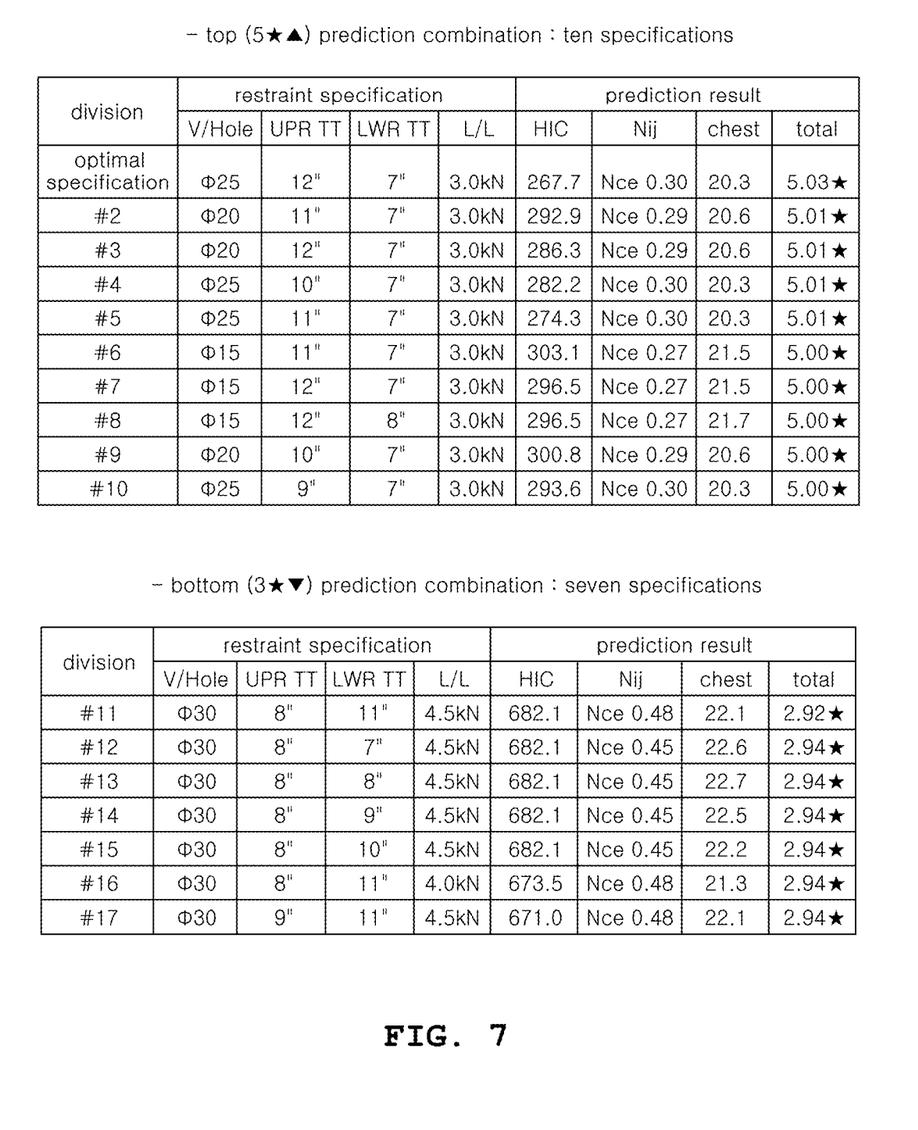
FIG. 7 is a diagram illustrating a comprehensive result indicator result table generated according to an embodiment of the present disclosure.

FIG. 7 is a diagram illustrating a comprehensive result indicator result table generated according to an embodiment of the present disclosure.

Referring to FIG. 7, a comprehensive result indicator result table generated according to an embodiment of the present disclosure is shown. The comprehensive evaluation indicators are calculated by using each injury prediction value among combinations of specifications for each design variable. The comprehensive evaluation indicator having the largest value may be selected to be an optimal specification.

Figure 8:
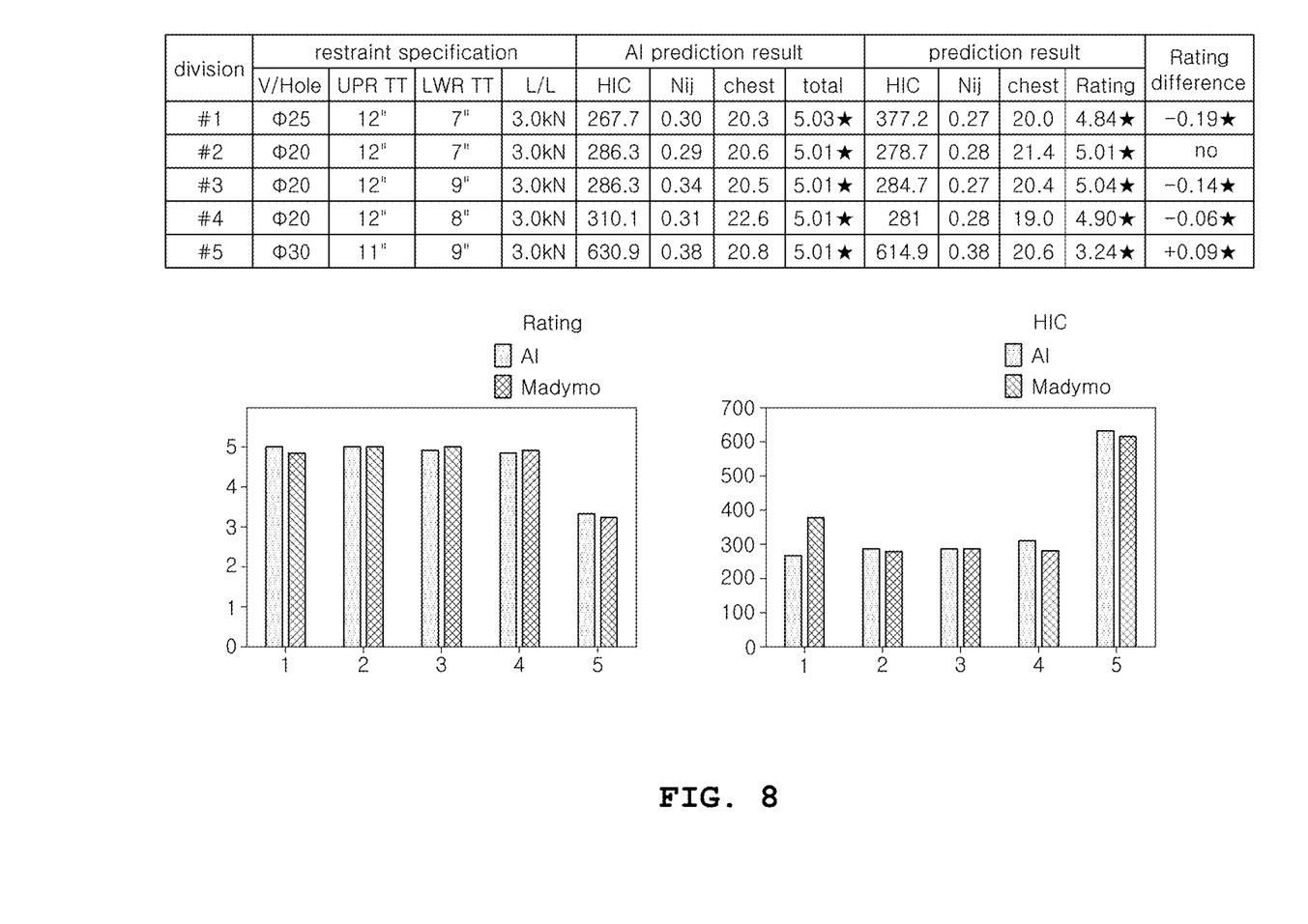
FIG. 8 is a table and a graph comparing a predicted result and an actual analysis result according to an embodiment of the present disclosure.

FIG. 8 illustrates a table and a graph comparing a predicted result and an actual analysis result according to an embodiment of the present disclosure.

Referring to FIG. 8, according to an embodiment of the present disclosure, the result predicted through the particle swarm optimization algorithm shows no difference or a close difference within an error from the actual analysis result. It is shown that there is a significant effect that can save time and money, as opposed to performing a number of evaluation tests for a practical interpretation.

Figure 9:
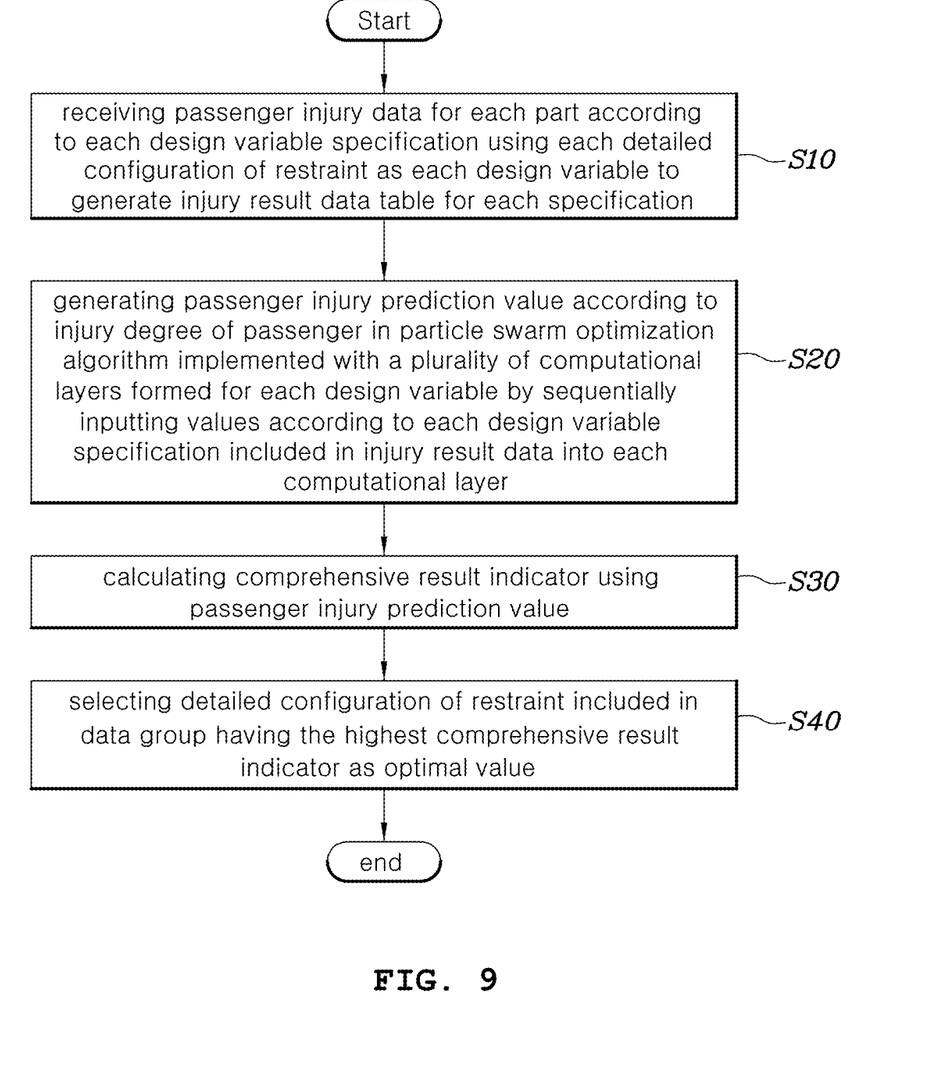
FIG. 9 is a flowchart illustrating a method of optimizing a restraint specification based on a particle swarm optimization algorithm according to an embodiment of the present disclosure.

FIG. 9 is a flowchart illustrating a method of optimizing a restraint specification based on a particle swarm optimization algorithm according to an embodiment of the present disclosure.

The passenger injury data for each part according to each design variable specification is received using each detailed configuration of the restraint as each design variable. Thus, an injury result data table for each specification (S10) may be generated.

According to an embodiment of the present disclosure, the passenger injury data for each part according to the specifications of each design variable may be input using each detailed configuration of the restraint as each design variable. Thus, an injury result data table is generated for each specification.

According to an embodiment of the present disclosure, the detailed configuration of the restraint is configured so that a DAB may include vent holes, an upper Tether (UPR Tether), and a lower Tether (LWR Tether), and the seat belt may include a load limiter. However, the present disclosure is not limited thereto. Any portion included in the restraint capable of affecting a passenger's injury according to a change in the specification may be used without limitation.

According to an embodiment of the present disclosure, the standards of a vent hole diameter, an upper tether length, a lower tether length, and a load limiter force for the detailed configuration of the restraint may be set as each design variable.

According to an embodiment of the present disclosure, each variable is normalized before inputting the standards for the detailed configuration of the restraint as each variable. A weight of each variable may be calculated by performing component analysis on each normalized variable.

According to an embodiment of the present disclosure, each detailed configuration may be set as a design variable. The passenger injury data for each part according to the change of each design variable specification is received. An injury result data table may be generated for each specification based on the received passenger injury data.

According to an embodiment of the present disclosure, the impact degree may be analyzed by sequentially inputting values according to the specifications of each design variable included in the injury result data into each computational layer. The analysis is performed in a particle swarm optimization algorithm implemented with a plurality of computational layers formed for each design variable. Thus, a weight for each variable is calculated by performing component analysis on each normalized variable.

According to an embodiment of the present disclosure, the plurality of computational layers may calculate each of the impact degree by using each of a vent hole diameter, an upper tether length, a lower tether length, and a load limiter force as a variable.

According to an embodiment of the present disclosure, a plurality of computational layers is arranged in the order of a vent hole diameter layer, an upper tether length layer, a lower tether length layer, and a load limiter force layer. Thus, a resultant value calculated in each layer may be an input value of a layer located behind the layer.

According to an embodiment of the present disclosure, each variable may be normalized before inputting the standard for the detailed configuration of the restraint as a variable.

According to an embodiment of the present disclosure, a passenger injury prediction value according to the injury degree of a passenger may be calculated by reflecting a weight for each variable.

The injury result data table for each design variable specification is input into the prediction model for each design variable specification and a passenger injury prediction result for each part. Thus, a passenger injury prediction value (S20) is generated.

According to an embodiment of the present disclosure, the injury result data table for each design variable specification is input into the prediction model on the passenger injury prediction results for each part and each design variable specification. Thus, the passenger injury prediction value is generated.

According to an embodiment of the present disclosure, the prediction model for the passenger injury prediction result for each part may be implemented based on a particle swarm optimization algorithm. The prediction model may be trained using an output value obtained by inputting the injury result data table.

According to an embodiment of the present disclosure, the training may be performed by reflecting the calculated weight in the prediction model.

According to an embodiment of the present disclosure, the prediction model may apply a numerical analysis technique to search for a function having the highest accuracy of the passenger injury prediction value when each specification of the design variable is input.

According to an embodiment of the present disclosure, a prediction model based on a particle swarm optimization algorithm for each design variable specification and a passenger injury prediction result for each part is generated. The prediction model is generated by using a third-order Hermit interpolation polynomial for each interval. A passenger injury prediction value may be generated by inputting an injury result data table for each design variable specification into the prediction model.

According to an embodiment of the present disclosure, the third-order Hermit interpolation polynomial for each interval may be used as a numerical analysis technique. However, the present disclosure is not limited thereto and any function capable of selecting an optimal value through numerical analysis may be used without limitation.

Here, the third-order Hermit interpolation polynomial for each interval may mean comparing the interpolation results generated in spline and pchip for two different functions. The third-order Hermit interpolation polynomial for each interval may make a vector consisting of an x value, a function value y at that point, and a query point xq.

In addition, operations of calculating interpolation at query points and plotting function values interpolated at query points for comparison using spline and pchip may be performed.

A comprehensive result indicator is calculated using the passenger injury prediction value (S30).

According to an embodiment of the present disclosure, a comprehensive result indicator may be calculated using the passenger injury prediction value. According to an embodiment, the comprehensive result indicator may be calculated according to a preset criterion using the injury prediction result for each part.

According to an embodiment of the present disclosure, the passenger injury prediction values for each part are calculated according to specifications for each design variable. The passenger injury prediction values for each part may be a HIC, a CD, and a Nij. The comprehensive result indicator may be calculated based on the calculated passenger injury prediction values for each part.

According to an embodiment of the present disclosure, the comprehensive result indicator may be calculated by reflecting the calculated weight of each variable in the passenger injury prediction value for each part.

The detailed configuration of the restraint included in a data group having the highest comprehensive result indicator is selected to be an optimal value (S40).

The detailed configuration of the restraint included in a data group having the highest comprehensive result indicator may be selected to be an optimal value.

According to an embodiment of the present disclosure, a passenger injury prediction value is calculated for a combination consisting of specifications of each design variable. The lower the calculated injury prediction value, the higher the comprehensive result indicator. Accordingly, a combination of the specifications for each design variable having the highest comprehensive result indicator may be selected as an optimal amount.

According to an embodiment of the present disclosure, the comprehensive result indicator may be calculated according to the NCAP evaluation method based on the injury prediction result for each part.

According to an embodiment of the present disclosure, a HIC, a CD, and a Nij may be selected as the predictive parts of the injury. A knee load (Fz) of 2.8 kN as a fixed variable may not be used as a variable for prediction.

Embodiments of the present disclosure are not implemented only by the above-described apparatus and/or method. The scope of the present disclosure is not limited thereto. Various modifications and improvements by those having ordinary skill in the art using the basic concept of the present disclosure as defined in the following claims are also within the scope of the present disclosure.

What is claimed is:

1. An apparatus for optimizing a restraint specification based on a particle swarm optimization algorithm using impact analysis between the restraint specification and a passenger injury, the apparatus comprising:

by using the particle swarm optimization algorithm that includes a plurality of computational layers, a restraint specification input unit configured to receive passenger injury data for each part according to each design variable specification using each detailed configuration of a restraint as each design variable to generate an injury result data table for each specification, wherein the restraint includes a vent hole, an upper tether length, a lower tether of a driver air bag and a load limiter in a seat belt, wherein the restrain is configured to affect the passenger injury in response to a change in a vent hole diameter of the vent hole, an upper tether length of an upper tether, a lower tether length of the lower tether, or a load limiter force of the load limiter;

a passenger injury prediction unit configured to generate a passenger injury prediction value by inputting the injury result data table for each design variable specification into a prediction model for each design variable specification and a passenger injury prediction result for each part and configured to use the passenger injury prediction value to calculate a comprehensive result indicator; and an optimal specification selection unit configured to select a detailed configuration of the restraint included in a data group with a highest comprehensive result indicator to be optimal value, wherein the passenger injury prediction unit includes an injury prediction result generator configured to generate the prediction model based on the particle swarm optimization algorithm for each design variable specification and the passenger injury prediction result for each part using a third-order Hermit interpolation polynomial for each interval and configured to input the injury result data table of each design variable specification into the prediction model to generate the passenger injury prediction value, and a comprehensive result calculator configured to calculate the comprehensive result indicator according to a preset criterion using the passenger injury prediction result for each part, wherein the plurality of computational layers is arranged in an order of a vent hole diameter layer, an upper tether length layer, a lower tether length layer, and a load limiter force layer, wherein a resultant value calculated in each layer becomes an input value of a layer located behind the layer, wherein the restraint specification input unit is further configured to analyze an impact degree by sequentially inputting numerical values according to each design variable specification included in injury result data into each computational layer in the particle swarm optimization algorithm so as to calculate a weight for each design variable, and wherein the prediction model is trained using the weight for each design variable.

2. The apparatus of claim 1, wherein the comprehensive result calculator is further configured to calculate the comprehensive result indicator according to a new car assessment program (NCAP) evaluation method based on the passenger injury prediction result for each part.

3. The apparatus of claim 1, wherein the restraint specification input unit is further configured to use standards of the vent hole diameter, the upper tether length, the lower tether length, and the load limiter force for the detailed configuration of the restraint as each design variable.

4. The apparatus of claim 1, wherein the particle swarm optimization algorithm is implemented with the plurality of computational layers formed for each design variable in order to calculate the weight for each design variable by performing component analysis on each of normalized variables.

5. The apparatus of claim 4, wherein the restraint specification input unit is provided so that the plurality of computational layers is capable of calculating the impact degree using each of the vent hole diameter, the upper tether length, the lower tether length, and the load limiter force as a variable.

6. The apparatus of claim 1, wherein the restraint specification input unit is further configured to normalize each variable before inputting standards for the detailed configuration of the restraint as each variable and further configured to perform weight analysis for each of normalized variables to calculate a weight for each variable.

7. The apparatus of claim 6, wherein the restraint specification input unit is further configured to calculate the passenger injury prediction value according to an injury degree of a passenger by reflecting the weight for each variable.

8. The apparatus of claim 1, wherein the injury prediction result generator is further configured to calculate passenger injury prediction results of a head injury criterion (HIC), a chest displacement (CD), and a neck injury criterion (Nij) as the passenger injury prediction result for each part.

9. A method of optimizing a restraint specification based on a particle swarm optimization algorithm using impact analysis between the restraint specification and a passenger injury, the method comprising:

using the particle swarm optimization algorithm that includes a plurality of computational layers;

arranging the plurality of computational layers in an order of a vent hole diameter layer, an upper tether length layer, a lower tether length layer, and a load limiter force layer;

using a resultant value calculated in each layer as an input value of a layer located behind the layer;

receiving passenger injury data for each part according to each design variable specification using each detailed configuration of a restraint as each design variable to generate an injury result data table for each specification, wherein the restraint includes a vent hole, an upper tether length, a lower tether of a driver air bag and a load limiter in a seat belt, wherein the restrain is configured to affect the passenger injury in response to a change in a vent hole diameter of the vent hole, an upper tether length of an upper tether, a lower tether length of the lower tether, or a load limiter force of the load limiter;

generating a passenger injury prediction value by inputting the injury result data table for each design variable specification into a prediction model for each design variable specification and a passenger injury prediction result for each part and calculating a comprehensive result indicator by using the passenger injury prediction value; and selecting a detailed configuration of the restraint included in a data group with a highest comprehensive result indicator to be optimal value, wherein the calculating of the comprehensive result indicator includes:

generating the prediction model based on the particle swarm optimization algorithm for each design variable specification and the passenger injury prediction result for each part using a third-order Hermit interpolation polynomial for each interval and generating the passenger injury prediction value by inputting the injury result data table of each design variable specification into the prediction model; and calculating the comprehensive result indicator according to a preset criterion using the passenger injury prediction result for each part, wherein the generating of the injury result data table is provided so that the plurality of computational layers are arranged in an order of a vent hole diameter layer, an upper tether length layer, a lower tether length layer, and a load limiter force layer and so that a resultant value calculated in each layer becomes an input value of a layer located behind the layer, wherein the generating of the injury result data table includes analyzing an impact degree by sequentially inputting numerical values according to each design variable specification included in injury result data into each computational layer in the particle swarm optimization algorithm so as to calculate a weight for each design variable, and wherein the prediction model is trained using the weight for each design variable.

10. The method of claim 9, wherein the calculating of the comprehensive result indicator includes:

calculating the comprehensive result indicator according to a new car assessment program (NCAP) evaluation method based on the passenger injury prediction result for each part.

11. The method of claim 9, wherein the generating of the injury result data table uses standards of the vent hole diameter, the upper tether length, the lower tether length, and the load limiter force for the detailed configuration of the restraint as each design variable.

12. The method of claim 9, wherein the generating of the injury result data table includes:

wherein the particle swarm optimization algorithm is implemented with the plurality of computational layers formed for each design variable in order to calculate the weight for each design variable by performing component analysis on each of normalized variables.

13. The method of claim 12, wherein the generating of the injury result data table is provided so that the plurality of computational layers is capable of calculating the impact degree using each of the vent hole diameter, the upper tether length, the lower tether length, and the load limiter force as a variable.

14. The method of claim 9, wherein the generating of the injury result data table includes:

normalizing each variable before inputting standards for the detailed configuration of the restraint as each variable and performing weight analysis for each of normalized variables to calculate a weight for each variable.

15. The method of claim 14, wherein the generating of the injury result data table includes:

calculating the passenger injury prediction value according to an injury degree of a passenger by reflecting the weight for each variable.

16. The method of claim 9, wherein the generating of the passenger injury prediction value includes:

calculating passenger injury prediction results of a head injury criterion (HIC), a chest displacement (CD), and a neck injury criterion (Nij) as the passenger injury prediction result for each part.

* * * * *